United States Patent [19]
Paul et al.

[11] Patent Number: 6,141,635
[45] Date of Patent: Oct. 31, 2000

[54] METHOD OF DIAGNOSING FAULTS IN AN EMULATED COMPUTER SYSTEM VIA A HETEROGENEOUS DIAGNOSTIC PROGRAM

[75] Inventors: Derek William Paul; Grace Jui-Yen Lin, both of Mission Viejo; Howard Jerald Keller, Carlsbad, all of Calif.

[73] Assignee: Unisys Corporation, Blue Bell, Pa.

[21] Appl. No.: 09/096,681

[22] Filed: Jun. 12, 1998

[51] Int. Cl.[7] ............................................. G06F 9/45
[52] U.S. Cl. ............................ 703/22; 703/26; 717/4
[58] Field of Search .................... 395/500.43, 500.41, 395/500.42, 500.44, 705, 707, 527, 704; 703/22, 23, 26; 717/4, 5

[56] References Cited

U.S. PATENT DOCUMENTS

| | | | |
|---|---|---|---|
| 5,450,586 | 9/1995 | Kuzara et al. | 717/4 |
| 5,548,717 | 8/1996 | Woolridge et al. | 703/22 |
| 5,560,013 | 9/1996 | Scalzi et al. | 395/705 |
| 5,600,790 | 2/1997 | Barnstijn et al. | 703/22 |
| 5,701,488 | 12/1997 | Mulchandnai et al. | 717/4 |
| 5,715,387 | 2/1998 | Barnstijn et al. | 717/4 |
| 5,740,441 | 4/1998 | Yellin et al. | 717/4 |
| 5,901,315 | 5/1999 | Edwards et al. | 703/22 |
| 5,905,855 | 5/1999 | Klaiber et al. | 714/31 |
| 5,978,902 | 11/1999 | Mann | 712/227 |
| 5,983,012 | 11/1999 | Bianchi et al. | 703/23 |
| 6,006,277 | 12/1999 | Talati et al. | 703/27 |
| 6,009,261 | 12/1999 | Scalzi et al. | 703/26 |

OTHER PUBLICATIONS

Leskela et al.; "Visualised Real–Time Operating System Simulation in a Hetergeneous Prototyping Environment", Proceedings of the Eighth Euromicro Workshop on Real–Time Systems, pp. 237–242. Jun. 1996.

Zhongmin et al.; "Rapid Protoyping for Simulation Debugging Environment: And Enhanced Developing Method for Embedded Computer Software", Proceedings of the 1995 International Conference on Acoustics, Speech and Signal Processing, pp. 2663–2666, May 1995.

Lindholm et al. "The Java TM Virtual Machine Specification", Addison Wesley, 1997.

*Primary Examiner*—Kevin J. Teska
*Assistant Examiner*—Douglas W. Sergent
*Attorney, Agent, or Firm*—Charles J. Fassbender; Mark T. Starr; Rocco L. Adornato

[57] ABSTRACT

An emulated computer system includes an instruction processor which directly executes a set of native instructions. Stored in a memory, which is coupled to the instruction processor, are a plurality of foreign user programs and a foreign operating system, each of which is a compilation of foreign instructions and data. Also stored in the memory is an emulator program which is a compilation of the native instructions that interprets the foreign instructions, and a native operating system which is a compilation of the native instructions under which the emulator program is run. To diagnose faults in this emulated computer system, a heterogeneous diagnostic program is provided in the memory, which is a compilation of the native instructions that reads the foreign user programs and foreign operating system from the memory and stores them in a reformatted form on a magnetic media. The heterogeneous diagnostic program is initiated in response to the occurrence of a user selectable event which indicates the presence of a defect in the foreign operating system or foreign user programs. Execution of the heterogeneous diagnostic program occurs while the native operating system is running and while one or more native user programs run under the native operating system.

13 Claims, 7 Drawing Sheets

METHOD OF DIAGNOSING FAULTS IN AN EMULATED COMPUTER SYSTEM VIA A HETEROGENEOUS DIAGNOSTIC PROGRAM

BACKGROUND OF THE INVENTION

This invention relates to emulated computer systems; and more particularly, it relates to methods of diagnosing faults in such systems.

Figure 1:
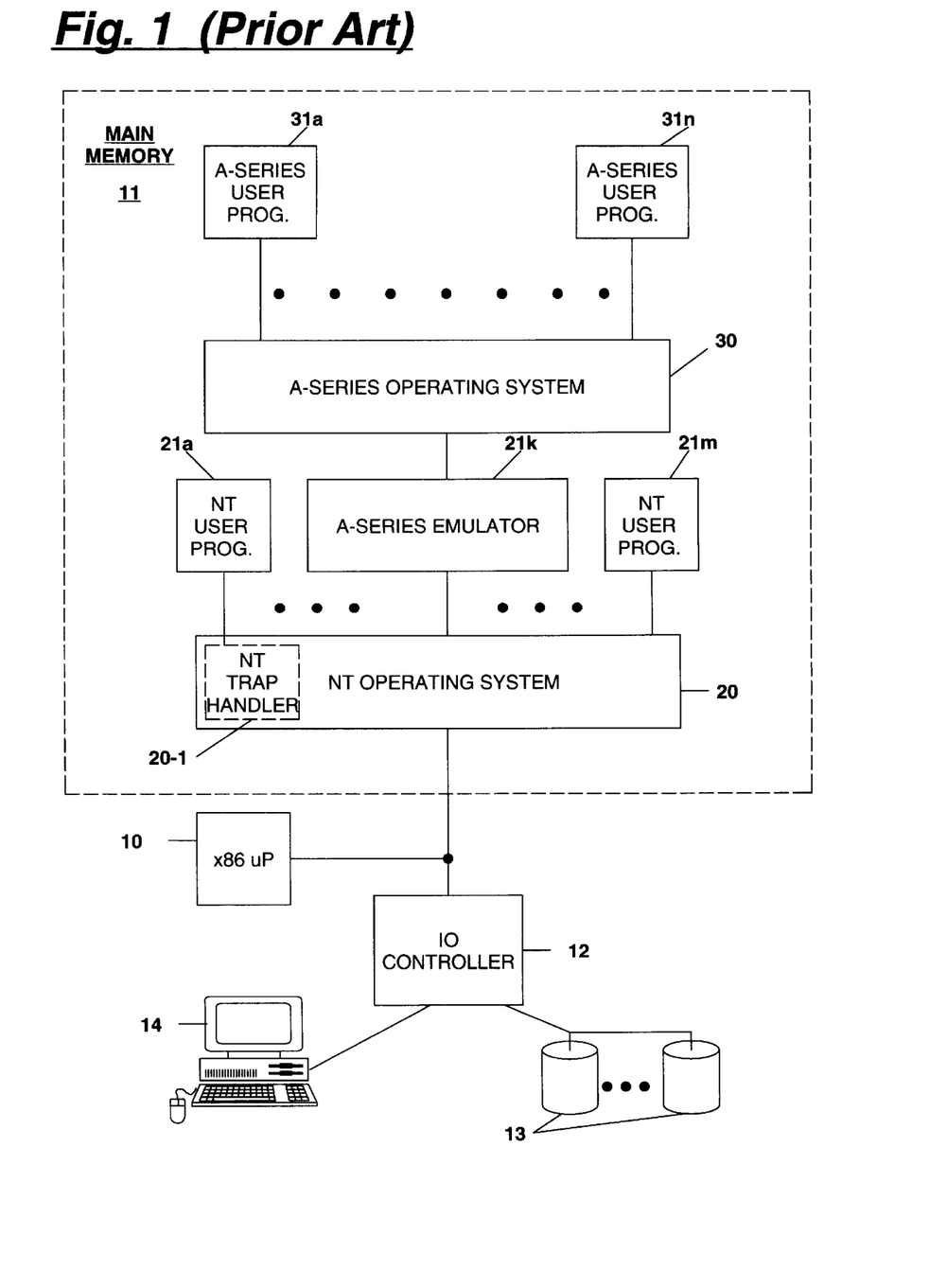
FIG. 1 shows an example of an emulated computer system in the prior art.

As background to the invention, FIG. 1 shows an example of an emulated computer system. Included as hardware in this FIG. 1 system is an x86 instruction processor 10, a main memory 11, an I/O controller 12, a disc storage unit 13, and an operator console 14. The x86 instruction processor is an Intel 386 processor, or an Intel 486 processor, or an Intel Pentium processor, an Intel Merced processor, or any other processor which has a compatible set of object code instructions. The main memory 11 is any memory which is made of integrated circuit chips.

Included as software in the FIG. 1 system is a native operating system 20 and multiple native user programs 21a–21m. This operating system 20 and all of the programs 21a–21m are native to the x86 instruction processor 10 because they are a compilation of object code instructions that are executed directly by the x86 instruction processor. A primary example of the native operating system 20 is any NT operating system from Microsoft Corporation, such as 4.0 Workstation or 4.0 Server.

Also included as software in the FIG. 1 system is an A-Series operating system 30 and multiple A-Series user programs 31a–31n. This operating system 30 and all of the programs 31a–31n are foreign to the x86 instruction processor 10 because they are a compilation of A-Series object code instructions which can be executed directly by an A-Series instruction processor. Examples of an A-Series instruction processor include the Unisys A7 processor, the Unisys A11 processor, the Unisys A16 processor, and any other processor which has a compatible set of object code instructions.

All of the NT user programs 21a–21m are executed under control of the NT operating system 20. One of these NT user programs 21k is an emulator program which interprets each of the A-Series object code instructions that are in the A-Series operating system 30 and A-Series user programs 31a–31m. These A-Series user programs 31a–31m are executed under control of the A-Series operating system 30.

For simplicity in FIG. 1, both of the operating systems 20 and 30, and all of the user programs 21a–21m and 31a–31n, are shown as residing in their entirety in the main memory 11. However, in reality, these operating systems and user programs are not all present in the main memory 11 at the same time. Instead, the operating systems and user programs are stored in their entirety in the disk storage unit 13, and the NT operating system 20 uses paging to retrieve portions of the NT user programs and A-Series operating system and A-Series user programs and store them in the main memory 11 as they are executed.

One particular characteristic of the NT operating system 20 which is especially relevant to the present invention is that it includes a subprogram 20-1, called an "NT Trap Handler," which generates a dump of the main memory 11 only when a "kernel stop error" occurs. This kernel stop error is a fatal error in that it causes the NT operating system 20 to stop running. In response, all of the NT user programs 21a–21m which are executed under control of the NT operating system also stop running; and thus, all of emulated A-Series programs 30 and 31a–31n also stop running.

An example of what causes a kernel stop error to occur is as follows. Suppose the NT operating system is attempting to execute an I/O command for an A-Series user program, such as program 31a, which calls for a block of data to be read from the main memory 11 and written onto the disk storage unit 13. If during the execution of that I/O command the page tables for the NT operating system somehow get corrupted to indicate that a page of the data block doesn't exist in the main memory 11, then a kernel stop error will occur.

All of the causes of the kernel stop error are pre-defined by the NT operating system. Consequently, the kernel stop error and its resulting main memory dump are too limited to be useful for debugging the A-Series programs 30 and 31a–31n. What is needed for debugging the A-Series programs is the ability to allow an A-Series programmer to request a memory dump on the occurrence of any event which is selectable by the programmer. Such an ability would enable the programmer to obtain a memory dump when events occur that identify software problems in the A-Series programs but are unrelated to kernel stop errors.

Another drawback of the NT operating system 20 is that even when the kernel stop error does occur, the resulting memory dump that is generated by the NT Trap Handler 20-1 in the NT operating system still has several deficiencies. First, the NT Trap Handler 20-1 dumps only the main memory 11, but that is not a dump of the entire emulated A-Series memory because NT uses paging. Thus, only those parts of the emulated A-Series memory which were recently used will be stored in the main memory 11. Second, portions of the main memory 11 which are dumped will be storing NT user programs and the NT operating system; and, they are irrelevant to detecting errors in the A-Series programs. Third, the main memory 11 is dumped in an NT format which is totally different than an A-Series format. For example, each word of memory in an NT format has thirty-two bits; whereas each word of memory in A-Series format has fifty-two bits.

Still another drawback of the NT operating system 20 is that after the kernel stop error occurs, the operating system needs to be rebooted in order to again become operational. This rebooting is required because when the kernel stop error occurs, the NT operating system 20 performs the main memory dump by writing the content of main memory 11 into the page file on the disk storage unit 13. Later, when the operating system is rebooted, that memory dump is copied into another file so that the page file can be used again.

Such rebooting is suitable for a stand-alone personal computer, but it is not acceptable when the A-Series programs that are being emulated are for a large scale computer which provides services to the terminals of hundreds of customers. For that case, what is needed is the ability to take a memory dump quickly, and quickly restore the system to full operation so that customer down time and inconvenience is minimized.

Accordingly, a primary object of the present invention is to provide an improved method of diagnosing faults in an emulated computer system by which the above problems are overcome.

BRIEF SUMMARY OF THE INVENTION

An emulated computer system, which uses the present invention, includes an instruction processor which directly executes a set of native instructions. This instruction processor is coupled to a memory which stores a foreign operating system and a plurality of foreign user programs, each of which is a compilation of foreign instructions and data. All of the foreign user programs are run under the control of the foreign operating system. Also stored in the memory is an emulator program which is a compilation of the native instructions that interprets the foreign instructions, and a native operating system which is a compilation of the native instructions under which the emulator program is run.

To diagnose faults via the present invention, a heterogeneous diagnostic program is also stored in the memory. This diagnostic program is heterogeneous because it is a compilation of the native instructions which reads the foreign user programs and foreign operating system from the memory and stores them on a magnetic media. Execution of the heterogeneous diagnostic program is initiated by the occurrence of a user selectable event; and its execution takes place while the native operating system is running and under control of the native operating system.

Since the heterogeneous diagnostic program is initiated in response to the occurrence of an event which is user selectable, that event can be selected by the user to be one which occurs only if the foreign operating system and/or foreign user program have a software problem. Then, the memory dump from the heterogeneous diagnostic program can be analyzed by a programmer to determine the cause of the software problem.

Also, since the heterogeneous diagnostic program is executed while the native operating system is running, the need to take a memory dump quickly and quickly restore the system to full operation is achieved. For example, multiple native user programs can be stored in the memory and be executed under the control of the native operating system while the heterogeneous diagnostic program is executing.

Preferably in the emulated computer system, the memory is comprised of a magnetic disk memory and a semiconductor memory; and, the native operating system moves portions of the foreign user programs and foreign operating system, as pages, between the magnetic disk memory and semiconductor main memory. In that system, the heterogeneous diagnostic program reads from the main memory only those pages of the foreign user programs and foreign operating system which are currently in the main memory; and it reads from the disk memory only those pages of the foreign user programs and foreign operating system which are not currently in the main memory. Consequently, the foreign user programs and foreign operating system are included in their entirety in the dump from the heterogeneous diagnostic program, but no portions of any native user programs in the main memory are included in the dump.

Also preferably, the heterogeneous diagnostic program stores the foreign user programs and foreign operating system in the memory dump with a format that is tailored to the foreign instructions and data. For example, each A-Series word in the memory dump from the heterogeneous diagnostic program consists of fifty-two bits that include four high order tag bits and forty-eight low order information bits. By comparison, each A-Series word in a memory dump from the NT-trap handler consists of sixty-four bits, with twelve bits being wasted, and the tag bits being the low order bits.

DETAILED DESCRIPTION

One preferred embodiment of an emulated computer system, which operates in accordance with the present invention, will now be described in conjunction with FIG. 2. This FIG. 2 system includes many of the components that are in the FIG. 1 prior art system; and those components have the same reference numerals.

Figure 2:
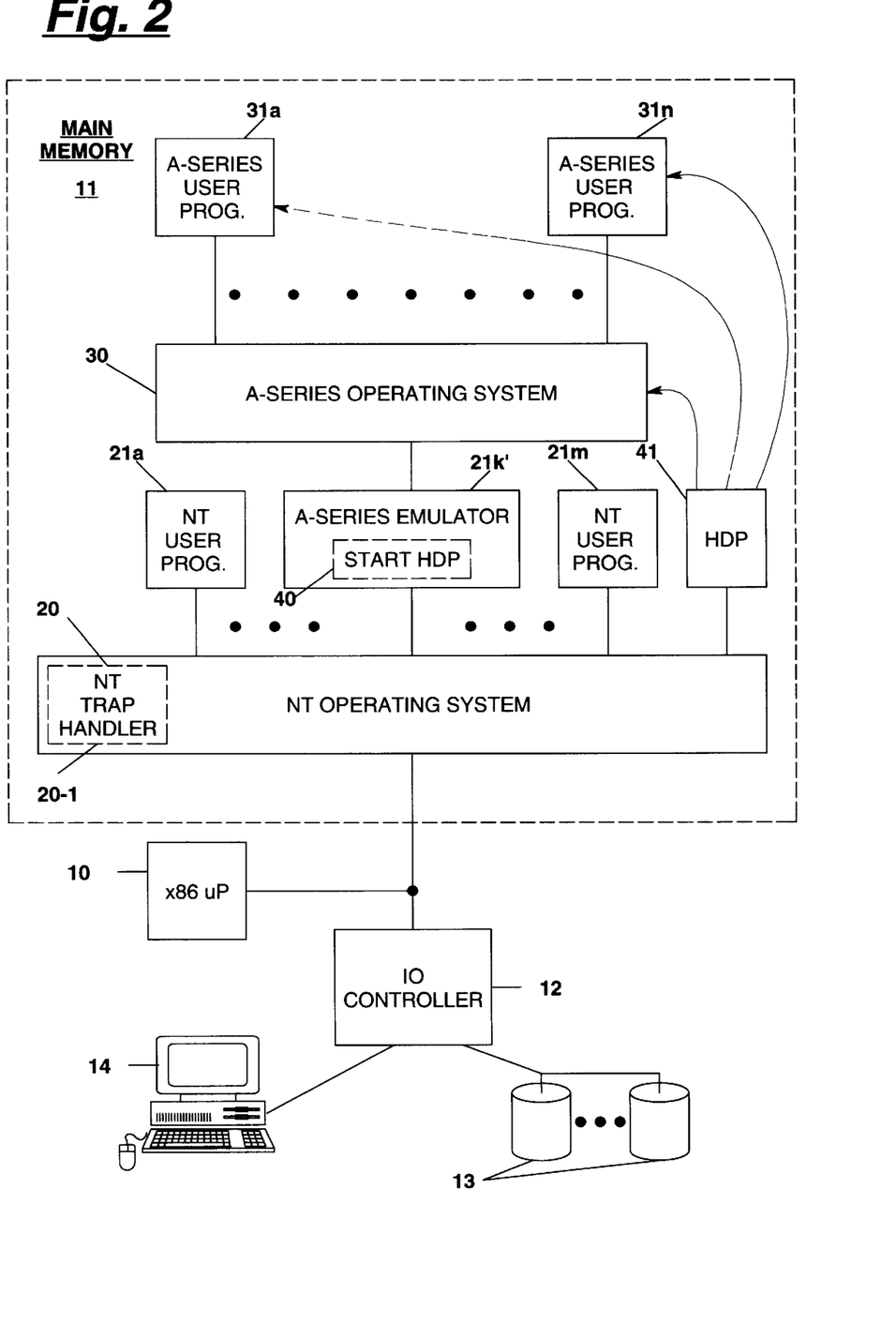
FIG. 2 shows a preferred embodiment of an emulated computer system which operates in accordance with the present invention.

Specifically, the components which are the same in the FIG. 1 system and the FIG. 2 system are components 10, 11, 12, 13, 14, 20-1, 21$a$, 21$m$, 30, 31$a$, and 31$n$. By comparison, the components which are different in the FIG. 2 system are components 21$k'$, 40 and 41.

Component 21$k'$, is an A-Series emulator which differs from the FIG. 1 emulator 21$k$ in that it includes a new subprogram 40 which is labeled "START HDP" in FIG. 2. Component 41 is a new heterogeneous diagnostic program which is labeled "HDP" in FIG. 2. No components in the FIG. 1 system correspond to the components 40 and 41 in the FIG. 2 system.

The emulator subprogram 40 is a compilation of object code instructions that are executed directly by the x86 instruction processor. This emulator subprogram 40 is executed under control of the native NT operating system 20 as part of the A-Series emulator 21$k'$.

In operation, the emulator subprogram 40 recognizes the occurrence of an event that indicates the presence of a software problem in the A-Series operating system and/or A-Series user programs. Then as a response to that event, the emulator subprogram 40 initiates the execution of the heterogeneous diagnostic program 41.

The heterogeneous diagnostic program 41 also is a compilation of object code instructions that are executed directly by the x86 instruction processor. This heterogeneous diagnostic program 41 is executed under control of the native NT operating system 20 after it is initiated by the emulator subprogram 40.

In operation, the heterogeneous diagnostic program 41 reads the A-series instructions and A-series data in the foreign operating system 30 and foreign user programs 31$a$–31$n$; and, it stores those instructions and data in a reformatted A-Series form on a magnetic media in the disk storage unit 13. Thus, the diagnostic program 41 is heterogeneous because it is a compilation of native x86 instructions which reads, reformats, and stores foreign A-Series programs under control of the native NT operating system.

One feature of the FIG. 2 system is that the heterogeneous diagnostic program 41 may be initiated by any event that the emulator subprogram 40 can detect which indicates that the foreign A-Series operating system 30 and/or foreign A-Series user programs 31$a$–31$n$ have a software problem.

Such an event is completely independent of a kernel stop error in the NT operating system. When this event occurs, the memory dump from the heterogeneous diagnostic program 41 can be analyzed by an A-Series programmer to determine the cause of the A-Series software problem.

Another feature of the FIG. 2 system is that the heterogeneous diagnostic program 41 is executed while the native operating system 20 is running. Consequently, the need to take a memory dump quickly, and quickly restore the system with a full capacity, is met. For example, multiple native NT user programs (such as programs 21a and 21m) can be executed under the control of the native NT operating system 20 while the heterogeneous diagnostic program 41 is executing and after its execution is completed.

Figure 3:
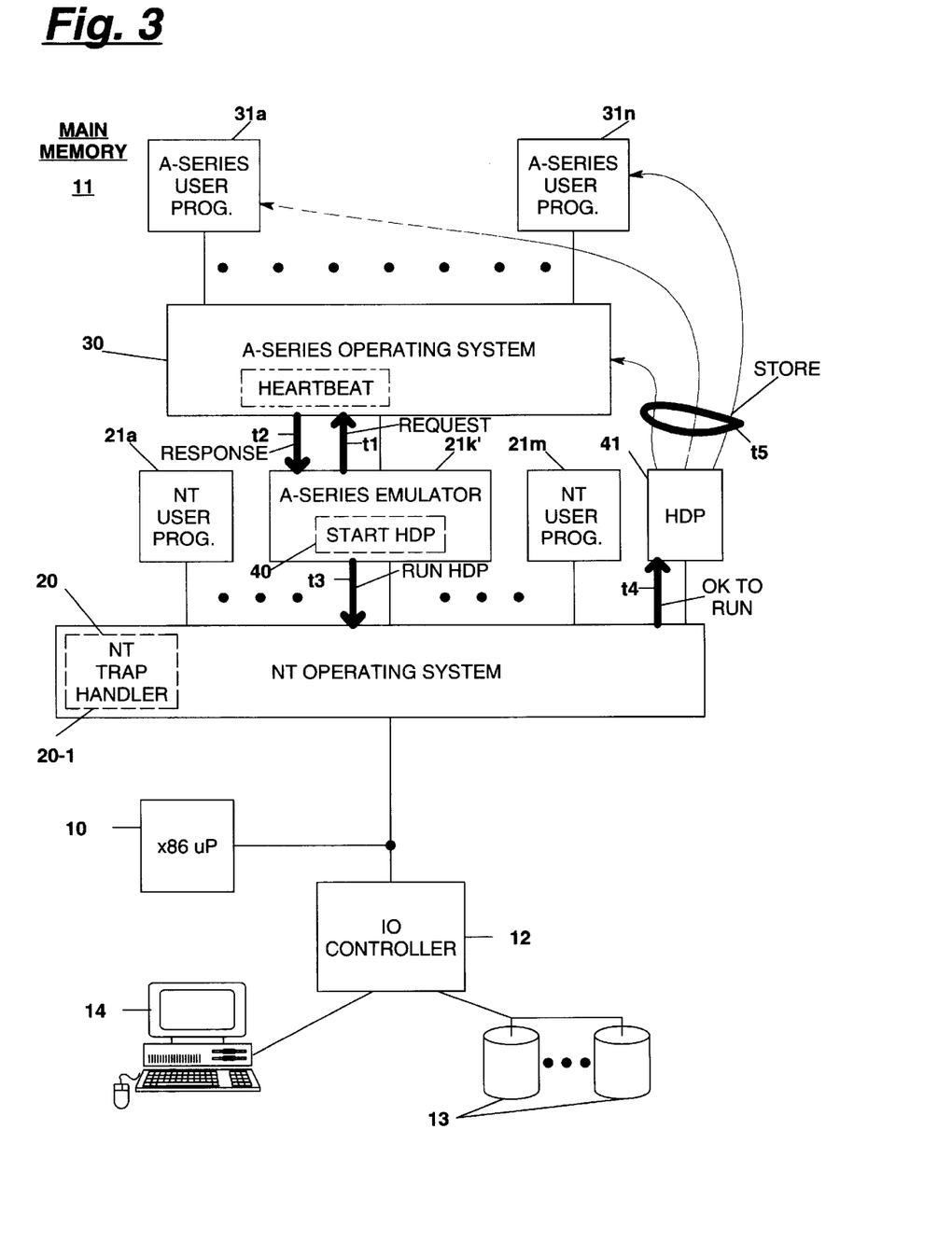
FIG. 3 shows one specific example of how the heterogeneous diagnostic program in the FIG. 2 system is initiated.

Referring now to FIG. 3, it shows one specific example of how the emulator subprogram 40 initiates the heterogeneous diagnostic program 41. in this FIG. 3 example, the emulator subprogram 40 attempts to maintain a heartbeat with the A-Series operating system 30; and this heartbeat occurs in FIG. 3 at time instants t1 and t2.

At time t1, the emulator subprogram 40 sends a request to the A-Series operating system 30 which asks for a response to be sent back within a certain time interval. This response is shown as occurring at time t2. However, if the A-Series operating system 30 has a certain type of problem, then the response at time t2 will not occur. For example, the A-Series operating system will not respond at time t2 if it has a problem which causes it to execute instructions in an endless loop. This problem will be detected by issuing the request at time t1 periodically.

When the emulator subprogram 40 receives no response from the A-Series operating system 30, the emulator subprogram 40 sends a request to the NT operating system 20 asking it to run the diagnostic program 41. This request is shown as occurring in FIG. 3 at time t3. In response, at time t4, the NT operating system grants run time to the diagnostic program 41. Then, at time t5, the diagnostic program 41 runs until it stores the A-Series operating system 30 and the A-Series user programs 31a–31n, in their entirety, in the disk storage unit 13.

While the heterogeneous diagnostic program 41 is running at time t5, the native operating system 20 and all of the native user programs 21a–21m continue to run, with the exception of the emulator 21k'. Also, those programs continue to run after the execution of the heterogeneous diagnostic program 41 has completed.

Figure 4:
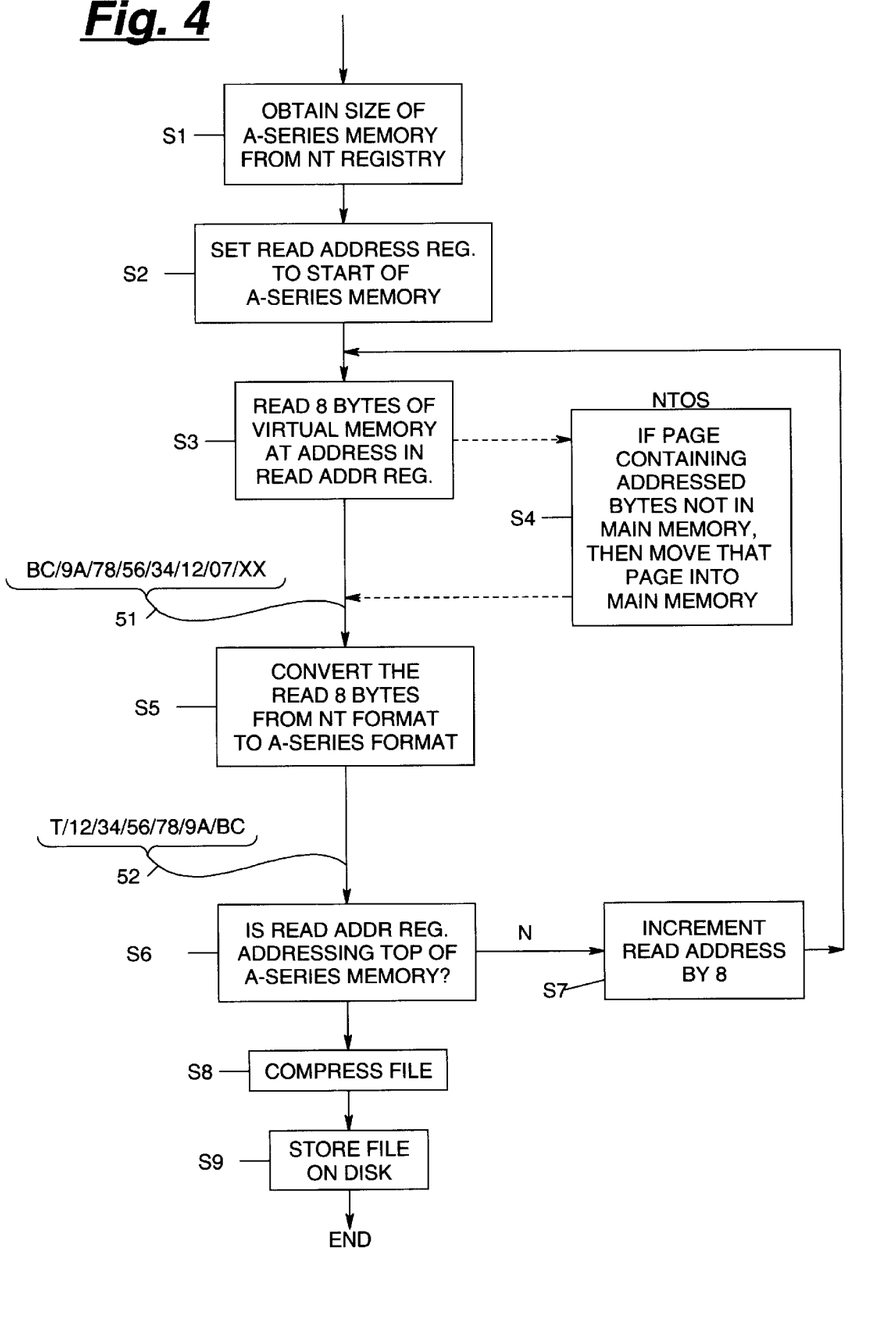
FIG. 4 shows all of the steps which are performed by the heterogeneous diagnostic program in the FIG. 2 system.

All of the steps which the diagnostic program 41 performs are shown in detail in FIG. 4. Initially, in step S1, the diagnostic program 41 obtains the size of the emulated A-Series memory and its starting address from a registry which lies within the NT operating system 20. These parameters of the emulated memory are held by the diagnostic program for further use.

Next in step S2, the diagnostic program 41 loads the starting address of the A-Series memory into a read address register. Then, in step S3, eight bytes of the emulated A-Series memory are read at the address which is in the read address register.

During the read in step S3, the NT operating system 20 checks to see if the page which contains the addressed eight bytes is currently in the main memory 11. If that page is not currently in the main memory 11, then the NT operating system performs step S4 by moving the page from the disk storage unit 13 into the main memory 11.

In step S5, the diagnostic program 41 converts the eight bytes of data which it read in step S3 from an emulated A-Series format to a true A-Series format. An example of one emulated A-Series word as it is read by step S3, is indicated in FIG. 4 by reference numeral 51; and, the corresponding word in a true A-Series format is indicated in FIG. 4 by reference numeral 52 as output from step S5.

Each of the characters B,C,9,A, etc., in the words 51 and 52 represent four bits of information. Character B in word 51 corresponds to character B in word 52; character C in word 51 corresponds to character C in word 52; etc. Each character x in word 51 represents four unused bits which are wasted. Character T in words 51 and 52 represents four A-Series tag bits which qualify the word as an instruction or data.

Next in step S6, the diagnostic program 41 compares the content of the read address register to the size of the emulated A-Series memory. If the read address register is not presently addressing the last A-Series word in the emulated A-Series memory, then step 87 is performed. There, the read address register is incremented by eight bytes to address the next A-Series word, and steps S3–S6 are repeated.

After the emulated A-Series memory has been read in its entirety by steps S3–S6, then steps S8 and S9 are performed. In step S8, all of the A-Series words are compressed; and in step S9, the resulting file is stored in the disk storage unit 13 for analysis by an A-Series programmer.

A feature of the FIG. 4 heterogeneous diagnostic program is that the memory dump which it generates includes the foreign A-Series operating system 30 and all of the foreign A-Series user programs 31a–31n, in their entirety. Also, that memory dump includes no portions of the native NT user programs 21a–21m or native NT operating system 20.

Figure 5:
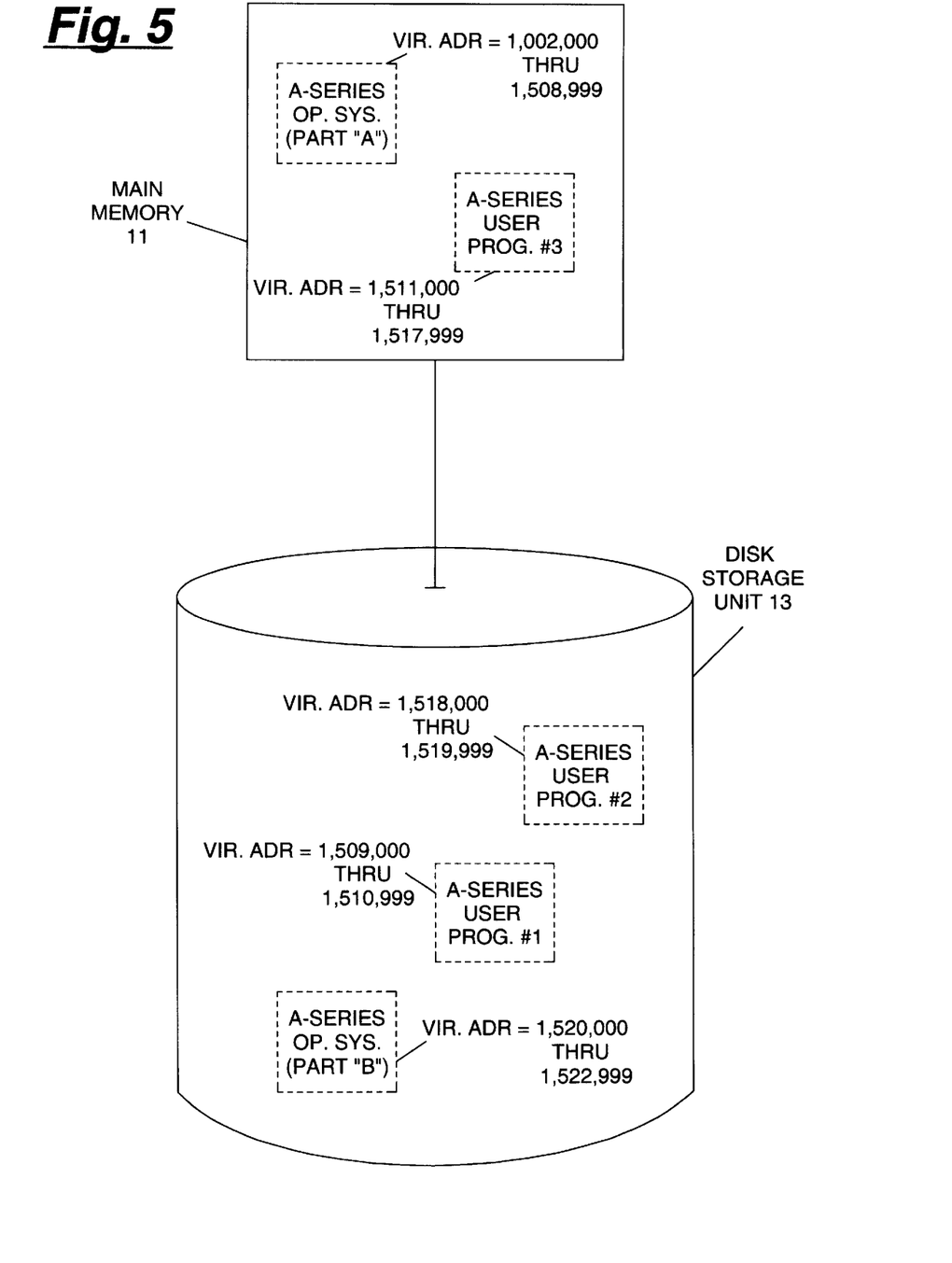
FIG. 5 shows a feature of the heterogeneous diagnostic program in the FIG. 2 system whereby an emulated memory is dumped in its entirety even though it resides on multiple pages that are scattered on a main memory and a disk.

An example which illustrates the above feature is shown in FIG. 5. In this example, the emulated A-Series memory includes the A-Series operating system and three A-Series user programs (#1–#3). At time t5 when the heterogeneous diagnostic program 41 is being executed, the main memory 11 is storing the A-Series user program #2, and a portion of the A-Series operating system (part A). All remaining portions of the emulated A-Series memory reside only on the disk storage unit 13.

When steps S3–S7 of the heterogeneous diagnostic program are performed, part A of the A-Series operating system is read first. This occurs because in the FIG. 5 example, part A of the A-Series operating system has the smallest virtual addresses; and so it occurs at the start of the emulated A-Series memory. Also, part A of the A-Series operating system will be read by the heterogeneous diagnostic program 41 directly from the main memory 11 because that is where part A happens to reside at time t5.

Next, by steps S3–S7 of the heterogeneous diagnostic program 41, the A-Series user program #1 will be read. This occurs because in the FIG. 5 example, the virtual address of the A-Series user program #1 follows the virtual address for part A of the A-Series operating system. Also, the A-Series user program #1 will be read from the disk storage unit 13, because in the FIG. 5 example, it does not reside in the main memory 11 at time t5.

Next, by steps S3–S7, the A-Series user program #3 will be read from the main memory 11. Then, the A-Series user program #2 will be read from the disk storage unit 13. Then, part B of the A-Series operating system will be read from the disk storage unit 13. This sequence occurs because the addresses and locations for those programs are as shown in FIG. 5.

Figure 6:
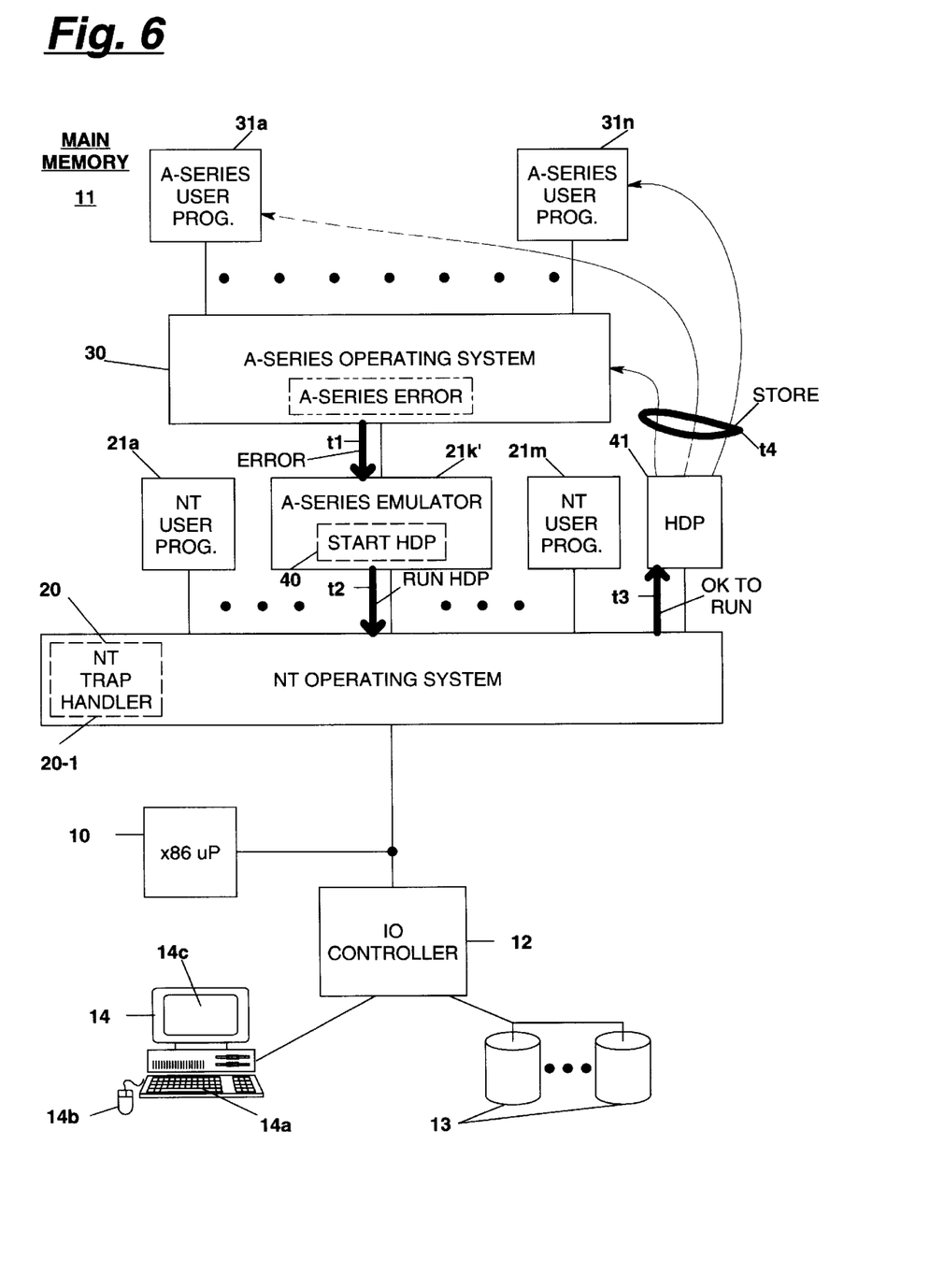
FIG. 6 shows another specific example of how the heterogeneous diagnostic program in the FIG. 2 system is initiated.

Turning now to FIG. 6, it shows another example of how the emulator subprogram 40 initiates the heterogeneous diagnostic program 41. In this FIG. 6 example, the emulator subprogram 40 receives an error signal at time t1 from the A-Series operating system 30 which indicates that it has detected an abnormal condition in the A-Series operating system or in one of the A-Series user programs 31a–31n.

Dozens of specific causes for this error signal, which are related solely to the A-Series programs, can be detected. As one example, the error signal can be generated when the A-Series operating system needs to bring information into the main memory 11 from the disk storage unit 13; but due to an error, the A-Series operating system is unable to retrieve the information from the disk storage unit.

As another example, the error signal can be generated when one of the A-Series user programs initiates a transfer of data from the main memory 11 to the console 14 for display on the screen 14c; but due to an error, the A-Series operating system is unable to complete the data transfer.

In FIG. 6, the error signal from the A-Series operating system 30 is shown as occurring at time t1. Then in response at time t2, the emulator subprogram 40 sends a request to the NT operating system 20 asking it to run the diagnostic program 41. Due to this request, the NT operating system grants run time to the diagnostic program 41 at time t3; and then at time t4, the diagnostic program 41 stores the A-Series operating system 30 and all of the A-Series user programs 31a–31n, in their entirety, by executing the steps S1–S9 of FIG. 4.

Figure 7:
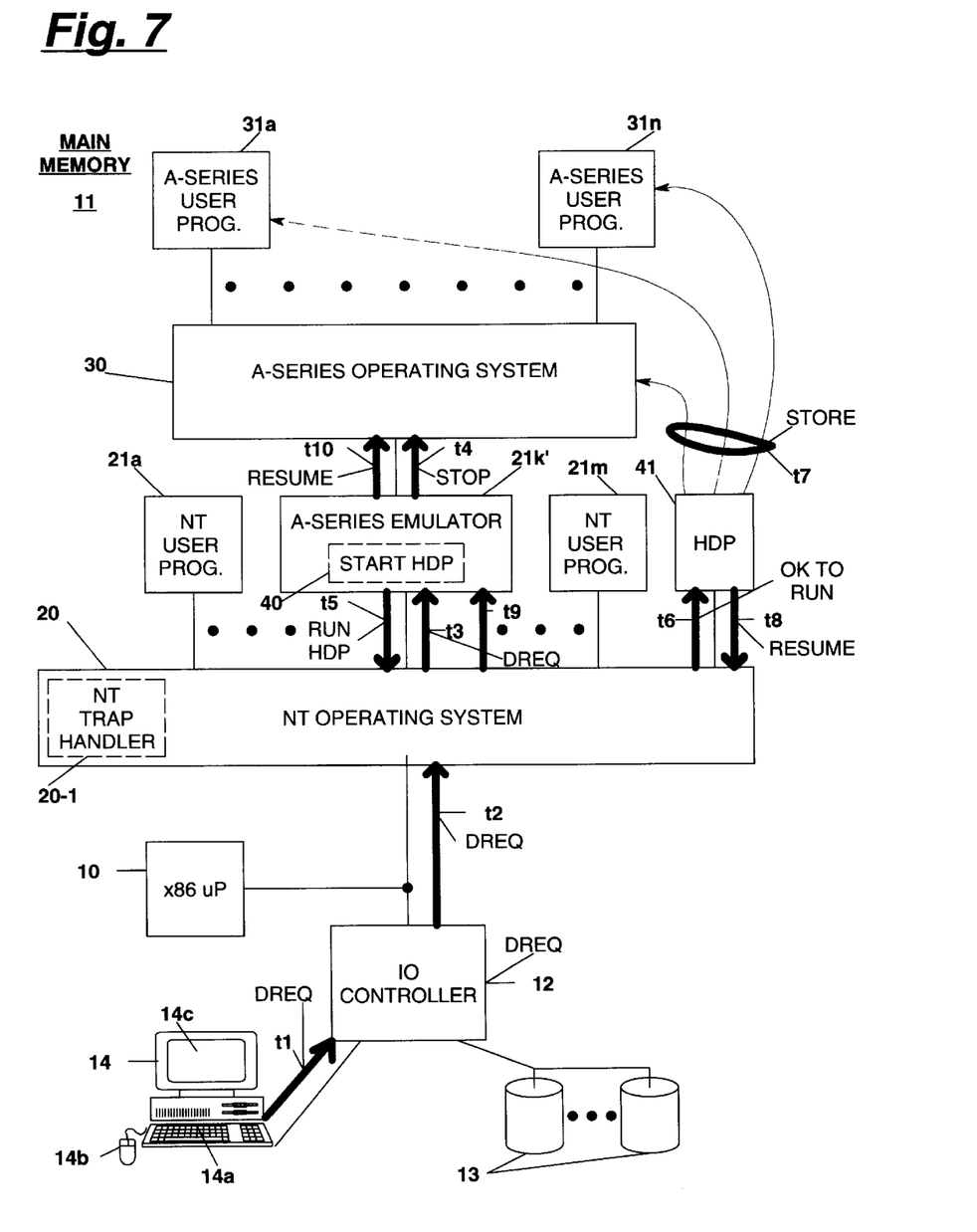
FIG. 7 shows still another specific example of how the heterogeneous diagnostic program in the FIG. 2 system is initiated.

Referring next to FIG. 7, it shows still another example of how the emulator subprogram 40 initiates the heterogeneous diagnostic program 41. In this FIG. 7 example, an operator of the console 14 makes a request for a dump of the emulated A-Series memory. This request is made by entering a predetermined command via the keyboard 14a or using the mouse 14b to click on a predetermined icon which is displayed on the screen 14c.

In response to the operator's request, the console 14 sends a dump request signal, DREQ, to the I/O controller 12; and that signal is then passed by the I/O controller 12 to the NT operating system 20 which in turn passes it to the A-Series emulator 21k'. This sequence is shown as occurring in FIG. 7 at times t1, t2, and t3.

Next, in response to the DREQ signal, the emulator subprogram 40 causes the A-Series operating system 30 and all of the A-Series user programs 31a–31n to stop running. This is achieved by sending a STOP signal to the A-Series operating system, which in FIG. 7 is shown as occurring at time t4. Due to this STOP signal, all of the pages of the emulated A-Series memory which happen to be in the main memory 11 at time t4 remain unchanged until the memory dump from the heterogeneous diagnostic program 41 is completely generated.

Next, at time t5, the emulator subprogram 40 asks the NT operating system 20 to grant run time to the diagnostic program 41. Thus, at time t6, the NT operating system does grant run time to the diagnostic program 41. Then at time t7, the diagnostic program 41 stores the A-Series operating system 30 and all of the A-Series user programs 31a–31n in their entirety by executing the steps s1–s9 of FIG. 4.

After the above memory dump is generated, the diagnostic program 41 sends a RESUME signal to the NT operating system 20 which indicates that the A-Series operating system and A-Series user programs can begin running again. In response, the NT operating system passes the RESUME signal to the A-Series emulator 21k'; and it in turn enables the A-Series operating system and all of the A-Series user program to again execute instructions. This signal sequence is shown in FIG. 7 as occurring times t8, t9, and t10.

Several preferred methods of diagnosing faults in an emulated computer system, by employing a heterogeneous diagnostic program, have now been described in detail. In addition, however, various changes can be made to those details without departing from the nature and spirit of the invention.

For example, the instruction processor 10 is not limited to an x86 instruction processor; but instead, it can be any instruction processor. Also, the native operating system 20 is not limited to an NT operating system from Microsoft Corporation; but instead, it can be any native operating system which is a compilation of object code instructions that are executed directly by the instruction processor 10. Further, the emulator 21k' is not limited to an emulator which interprets A-Series instructions; but instead, it can be an emulator which interprets any set of foreign instructions which are not executed directly by the instruction processor 10. The foreign operating system 30 and foreign user programs 31a–31n are a compilation of those foreign instructions. For example, the foreign instructions can be those which are executed directly by a 2200-Series computer from Unisys Corporation.

Accordingly, it is to be understood that the present invention is not limited to the details of the illustrated preferred embodiments but instead is defined by the appended claims.

What is claimed is:

1. A method of diagnosing faults in an emulated computer system that includes—an instruction processor, coupled to a memory, which directly executes a set of native instructions; a plurality of foreign user programs in said memory, each of which is a compilation of foreign instructions and data; a foreign operating system in said memory, which is a compilation of said foreign instructions under which said foreign user programs are run; an emulator program in said memory, which is a compilation of said native instructions that interprets said foreign instructions; a plurality of native user programs in said memory, each of which is a compilation of said native instructions; and, a native operating system in said memory which is a compilation of said native instructions under which said emulator program and said native user programs are run; wherein said method includes the steps of:

providing a heterogeneous diagnostic program in said memory which is a compilation of said native instructions that reads all of said foreign user programs and said foreign operating system from said memory and stores them on a magnetic media, but reads and stores none of said native user programs;

initiating the execution of said heterogeneous diagnostic program in response to the occurrence of a user selectable event; and, executing said heterogeneous diagnostic program while said native user programs are running and under control of said native operating system.

2. A method according to claim 1 wherein said foreign operating system and said emulator program attempt to maintain a heartbeat between them, and said user selectable event is the stopping of said heartbeat.

3. A method according to claim 1 wherein said user selectable event is a fault which causes said foreign operating system to stop running but not stop said native operating system.

4. A method according to claim 3 wherein said emulated computer system includes an external device, and said fault causes said foreign operating system to stop running when said foreign operating system attempts to send data to said external device.

5. A method according to claim 3 wherein said emulated computer system includes an external device, and said fault causes said foreign operating system to stop running when said foreign operating system attempts to receive data from said external device.

6. A method according to claim 1 wherein said user selectable event is an input signal from an operator to said native operating system.

7. A method according to claim 6 wherein said foreign operating system is suspended from executing while said heterogeneous diagnostic program is executing, and resumes execution when the execution of said heterogeneous diagnostic program is completed.

8. A method according to claim 1 wherein said native operating system moves portions of said foreign user programs and foreign operating system, as pages, between a magnetic disk memory and semiconductor main memory; and, said heterogeneous diagnostic program reads from said disk memory only those pages of said foreign user programs and foreign operating system which are not currently in said main memory.

9. A method according to claim 1 wherein said native operating system partitions said foreign user programs and foreign operating system into pages with consecutive virtual addresses but stores those pages in said memory such that the virtual addresses are out of order; and wherein, said heterogeneous diagnostic program sequentially reads and stores said pages such that said virtual addresses are in order.

10. A method according to claim 1 wherein said foreign instructions and data are read from said memory by said heterogeneous diagnostic program with a first format, and are stored on said magnetic media by said heterogeneous diagnostic program with a second format which is substantially different than said first format.

11. A method according to claim 1 wherein said instruction processor is an x86 instruction processor, and said native operating system is an NT operating system.

12. A method according to claim 11 wherein said foreign operating system is an A-Series operating system.

13. A method according to claim 11 wherein said foreign operating system is a 2200 series operating system.

* * * * *